(12) United States Patent
Uchida et al.

(10) Patent No.: US 11,517,985 B2
(45) Date of Patent: Dec. 6, 2022

(54) SOLDER COMPOSITION

(71) Applicant: KOKI COMPANY LIMITED, Tokyo (JP)

(72) Inventors: Noriyoshi Uchida, Tokyo (JP); Duck-Soo Jang, Kyonggi-Do (KR); Ju-Heung Kim, Kyonggi-Do (KR); Ho-Won Seok, Kyonggi-Do (KR)

(73) Assignee: KOKI COMPANY LIMITED, Tokyo (JP)

( * ) Notice: Subject to any disclaimer, the term of this patent is extended or adjusted under 35 U.S.C. 154(b) by 0 days.

(21) Appl. No.: 16/309,348

(22) PCT Filed: Jul. 11, 2017

(86) PCT No.: PCT/JP2017/025326
§ 371 (c)(1),
(2) Date: Dec. 12, 2018

(87) PCT Pub. No.: WO2018/034083
PCT Pub. Date: Feb. 22, 2018

(65) Prior Publication Data
US 2019/0308284 A1  Oct. 10, 2019

(30) Foreign Application Priority Data

Aug. 16, 2016 (JP) ............................. JP2016-159504

(51) Int. Cl.
*B23K 35/36* (2006.01)
*B23K 35/30* (2006.01)
(Continued)

(52) U.S. Cl.
CPC .......... *B23K 35/3613* (2013.01); *B23K 35/22* (2013.01); *B23K 35/302* (2013.01); *B23K 2103/12* (2018.08)

(58) Field of Classification Search
CPC ....................... B23K 35/3613; B23K 35/302
(Continued)

(56) References Cited

U.S. PATENT DOCUMENTS 4,994,326 A   2/1991   Shimmura et al.
5,215,601 A   6/1993   Gomi et al.
(Continued)

FOREIGN PATENT DOCUMENTS

CN   102049634 A   5/2011
CN   104057215 A   9/2014
(Continued)

OTHER PUBLICATIONS

Written Opinion of the International Searching Authority (Form PCT/ISA/237) for International Patent Application No. PCTIJP2017/025326, issued from the Japan Patent Office, dated Oct. 10, 2017, with English-language translation, 9 pages.
(Continued)

*Primary Examiner* — Weiping Zhu
(74) *Attorney, Agent, or Firm* — Kilyk & Bowersox, P.L.L.C.

(57) ABSTRACT

Provided is a solder composition including a flux, a solder alloy, and a silicone oil. The solder composition can have a kinematic viscosity at 25° C. of 5000 mm$^2$/s or more and 200,000 mm$^2$/s or less. The silicone oil can be at least one member selected from the group consisting of dimethyl silicone oil, methylphenyl silicone oil, methylhydrogen silicone oil, reactive silicone oil, and non-reactive silicone oil.

11 Claims, 3 Drawing Sheets

(51) Int. Cl.
*B23K 35/22* (2006.01)
*B23K 103/12* (2006.01)

(58) Field of Classification Search
USPC .......................................................... 148/25
See application file for complete search history.

(56) References Cited

U.S. PATENT DOCUMENTS

| | | | |
|---|---|---|---|
| 2012/0248616 A1 | | 10/2012 | Kitajima et al. |
| 2014/0053954 A1* | | 2/2014 | Inoue ................... B23K 35/362 148/24 |

FOREIGN PATENT DOCUMENTS

| JP | S55103273 A | | 8/1980 |
|---|---|---|---|
| JP | S62199290 A | | 9/1987 |
| JP | H01113198 A | | 5/1989 |
| JP | H0592296 A | | 4/1993 |
| JP | 2006088205 A | * | 4/2006 |
| JP | 2006088205 A | | 4/2006 |
| JP | 2008012576 A | | 1/2008 |
| JP | 2012072213 A | * | 4/2012 |
| JP | 2012072213 A | | 4/2012 |

OTHER PUBLICATIONS

Notification of Final Rejection for Japanese Patent Application No. JP 2016-159504, issued from the Japan Patent Office, dated Sep. 4, 2018, with English-language translation, 6 pages.
International Search Report (Form PCT/ISA/210) for International Patent Application No. PCT/JP2017/025326, issued from the Japan Patent Office, dated Oct. 10, 2017, 5 pages.
Written Opinion of the International Searching Authority (Form PCT/ISA/237) for International Patent Application No. PCT/JP2017/025326, issued from the Japan Patent Office, dated Oct. 10, 2017, 4 pages.
"Silicone Fluid KF-96 Performance Test Results," Technical data, Shin-Etsu Silicone Co., Ltd., Tokyo, Japan. 2014, 36 pages.
Technical material of Wacker Asahikasei Silicone Co., Ltd., with partial translation of relevant information.

* cited by examiner

|  | Example 1 | Example 2 | Example 3 | Example 4 | Example 5 | Example 6 | Example 7 |
|---|---|---|---|---|---|---|---|
| Flux | Flux 1 | Flux 2 | Flux 1 | Flux 1 | Flux 1 | Flux 1 | Flux 1 |
|  | 11.0% | 11.0% | 11.0% | 11.0% | 11.0% | 11.0% | 11.0% |
| Silicone oil 1 | 0.5% | 0.5% | 0.1 | 0.2 | 1 | — | — |
| Silicone oil 2 | None | None | None | None | None | 0.5 | — |
| Silicone oil 3 | None | None | None | None | None | None | 0.5 |
| Solder alloy | 88.5% | 88.5% | 89.0% | 89.0% | 89.0% | 89.0% | 89.0% |
| Number of scattering | 0 to 5 | 10 to 20 | 0 to 5 | 0 to 5 | 0 to 5 | 0 to 5 | 0 to 5 |
| Void fraction (Cu plate stacked) | Average 4.1% | Average 3.0% | Average 3.6% | Average 3.5% | Average 3.3% | Average 3.1% | Average 4.2% |
| Scattering photograph |  |  |  |  |  |  |  |

FIG. 3

|  | Comparative Example1 | Comparative Example2 | Comparative Example3 | Comparative Example4 |
|---|---|---|---|---|
| Flux | Flux 1<br>11.0% | Flux 2<br>11.0% | Flux 1<br>11.0% | Flux 1<br>11.0% |
| Vinyl ether polymer | None | None | 0.5 | None |
| Olefin polymer | None | None | None | 0.5 |
| Solder alloy | 89.0% | 89.0% | 89.0% | 89.0% |
| Number of scattering | 20 or more | 50 or more | 20 to 30 | 20 to 30 |
| Void fraction (Cu plate stacked) | Average 7.5% | Average 5.5% | Average 3.5% | Average 4.1% |
| Scattering photograph | | | | |

SOLDER COMPOSITION

FIELD OF THE INVENTION

The present invention relates to a solder composition.

BACKGROUND TO THE INVENTION

The solder used for joining electronic components or the like is made of a solder composition containing a solder alloy and a flux. As a solder composition, a solder alloy, a flux and the like mixed so as to form a paste and the like are known. For example, the solder composition is disposed by a coating means such as printing on a component joining part of a printed wiring board, a joining component such as an electronic component is disposed on the solder composition, and the solder composition is melted by heating (reflowing) and the joining part and the joining part are joined by soldering. At the time of reflowing, volatile components in the flux volatilize to generate gas, and flux and solder balls are scattered by the gas (hereinafter also referred to simply as scattering). As a technology for suppressing such scattering, for example, Patent Document 1 describes that an antifoaming agent that is a specific solubility parameter is used as a flux component. However, with these conventional solder compositions, there is a problem that scattering cannot be sufficiently suppressed.

DOCUMENT FOR PRIOR ART

Patent Document 1: JP 2015-131336 A

SUMMARY OF THE INVENTION

Problem to be Solved by the Invention

The present invention has been made in view of the problems of the prior art as described above, and it is an object to provide a solder composition capable of sufficiently suppressing occurrence of scattering during heating.

Means for Solving the Problems

The present invention contains a flux, a solder alloy, and a silicone oil.

According to the present invention, occurrence of scattering during heating can be sufficiently suppressed.

In the present invention, the kinematic viscosity of the silicone oil at 25° C. may be 5000 mm$^2$/s or more and 200,000 mm$^2$/s or less.

In the present invention, the silicone oil may be at least one member selected from the group consisting of dimethyl silicone oil, methylphenyl silicone oil, methylhydrogen silicone oil, reactive silicone oil, and non-reactive silicone oil.

In the present invention, the silicone oil may be contained in an amount of 0.05% by mass or more and 2% by mass or less.

In the present invention, the solder alloy may be a lead-free alloy.

Effects of Invention

According to the present invention, it is possible to provide a solder composition capable of sufficiently suppressing occurrence of scattering.

BRIEF DESCRIPTION OF THE DRAWINGS

FIG. 3 is a table showing the formulations in which the materials shown are mixed for the method of preparing Examples 1-7.

DETAILED DESCRIPTION OF THE INVENTION

Figure 1:
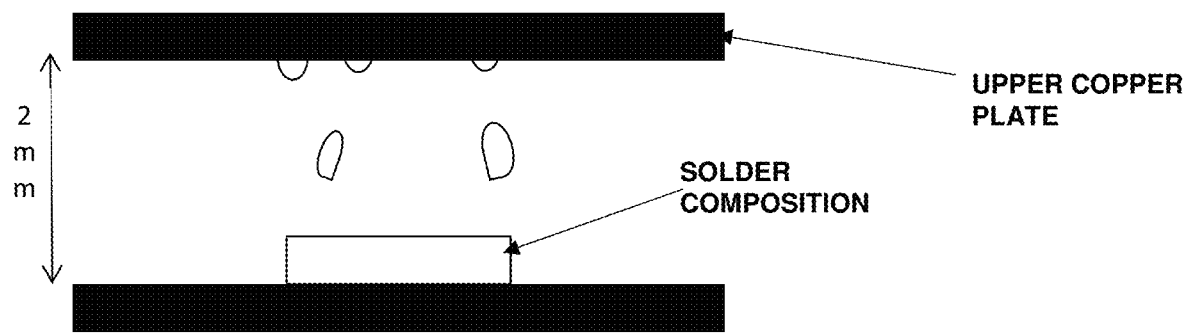
FIG. 1 is a schematic diagram showing a test method of an example.

An example of the solder composition according to the present invention is described below.

The solder composition of the present embodiment contains a flux, a solder alloy, and a silicone oil.

The silicone oil in the present embodiment is a polysiloxane containing a siloxane bond and is not particularly limited as long as it has straight chain and fluidity at ordinary temperature. Examples thereof include straight silicone oils such as dimethyl silicone oil, methylphenyl silicone oil and methylhydrogen silicone oil, modified silicone oils such as amino-modified silicone oil, epoxy-modified silicone oil, carboxyl-modified silicone oil, carbinol-modified silicone oil, methacryl-modified silicone oil, mercapto-modified silicone oil, polyether-modified silicone oil, methylstyryl-modified silicone oil, alkyl-modified silicone oils having 1 to 20 carbon atoms, fluorine-modified silicone oil and modified with higher fatty acid ester silicone oil, and the like. Among them, straight silicone oils such as dimethyl silicone oil, methylphenyl silicone oil and methylhydrogen silicone oil are preferable.

Examples of the silicone oil in the present embodiment include those having a kinematic viscosity at 25° C. of 5000 mm$^2$/s or more and 200,000 mm$^2$/s or less, and preferably 10,000 mm$^2$/s or more and 100,000 mm$^2$/s or less.

When the kinematic viscosity of the silicone oil in the solder composition is in the above range, scattering upon heating can be sufficiently suppressed. Also, voids in the solder composition can be suppressed.

The kinematic viscosity of the silicone oil in the present embodiment refers to a kinematic viscosity measured with Ubbelohde Viscometers described in JIS Z 8803 6.2.3.

The silicone oil can be used in the present embodiment has a weight average molecular weight of about 10,000 to 120,000, and preferably about 50,000 to 95,000.

When the weight average molecular weight of the silicone oil is within the above range, scattering can be sufficiently suppressed.

In the solder composition of the present embodiment, the content of the silicone oil is, for example, 0.05% by mass or more and 2% by mass or less, and preferably 0.1% by mass or more and 1.0% by mass or less, and the like.

When the content of the silicone oil in the solder composition is in the above range, scattering upon heating can be sufficiently suppressed. Also, voids in the solder composition can be suppressed.

The solder composition of the present embodiment contains a flux.

The flux is not particularly limited as long as it is a flux containing a known flux component generally used in a solder composition.

As a known flux component, the solder composition may contain, for example, a resin component, an activator component, a solvent component, an antioxidant component, a thixotropic component, and the like.

The resin component is not particularly limited as long as it is a known resin component used as a resin component of the flux such as a synthetic resin or a natural resin. Examples thereof include polymerized rosin, hydrogenated rosin, natural rosin, disproportionated rosin, acid-modified rosin, and the like.

The resins can be used alone or in combination of two or more kinds.

The content of the resin component in the flux is not particularly limited, but it is, for example, 1.0% by mass or more and 95% by mass or less, and preferably 20% by mass or more and 60% by mass or less, and the like.

The activator component is not particularly limited as long as it is a known component used as an activator component of the flux. For example, an organic acid, an amine halogen salt or the like can be used. Examples of the organic acid include glutaric acid, adipic acid, azelaic acid, sebacic acid, stearic acid, benzoic acid, and the like. Examples of amine of the amine halogen salt include diethylamine, dibutylamine, tributylamine, diphenylguanidine, cyclohexylamine, and the like. Examples of corresponding halogen include fluorine, chlorine, bromine, iodine, and astatine.

The activators can be used alone or in combination of two or more kinds.

The content of the activator component in the flux is not particularly limited, but it is, for example, 0.1% by mass or more and 50% by mass or less, and preferably 1.0% by mass or more and 20% by mass or less, and the like.

When the activator component in the flux is within the above range, it is possible to sufficiently exert the activating power of the activator without impairing the effect of suppressing scattering.

The solvent component is not particularly limited as long as it is a known component used as a solvent component of the flux. Examples thereof include glycol ethers such as diethylene glycol monohexyl ether (hexyldiglycol), diethylene glycol dibutyl ether (dibutyldiglycol), diethylene glycol mono 2-ethylhexyl ether (2 ethylhexyldiglycol) and diethylene glycol monobutyl ether (butyldiglycol); aliphatic compounds such as n-hexane, isohexane and n-heptane; esters such as isopropyl acetate, methyl propionate and ethyl propionate; ketones such as methyl ethyl ketone, methyl n-propyl ketone and diethyl ketone; alcohols such as ethanol, n-propanol, isopropanol and isobutanol, and the like.

The solvents can be used alone or in combination of two or more kinds. When a solvent component having a relatively low boiling point is used as the solvent component of the flux, it volatilizes at a low temperature, so gas is generated at the time of preheating before reflowing, so that scattering at the time of reflowing can be suppressed, but on the other hand, printability of the solder composition may be deteriorated.

Since the solder composition of the present embodiment contains a silicone oil, it is possible to use the above solvent components as solvent components without limitation.

The content of the solvent component in the flux is not particularly limited, but it is, for example, 1.0% by mass or more and 95% by mass or less, and preferably 20% by mass or more and 60% by mass or less, and the like.

The antioxidant component is not particularly limited as long as it is a known component used as an antioxidant component of the flux. Examples thereof include hindered phenol type antioxidants, phenol type antioxidants, bisphenol type antioxidants, polymer type antioxidants, and the like. The content of the antioxidant in the flux is not particularly limited, but it is, for example, 0.1% by mass or more and 50% by mass or less, and preferably 1.0% by mass or more and 20% by mass or less, and the like.

The thixotropic component is not particularly limited as long as it is a known component used as a thixotropic component of the flux. Examples thereof include hydrogenated castor oil, fatty acid amides, and oxy fatty acids.

The content of the thixotropic component in the flux is not particularly limited, but it is, for example, 0.1% by mass or more and 50% by mass or less, and preferably 1.0% by mass or more and 20% by mass or less, and the like.

The flux for soldering of the present invention may further contain other additives.

The solder composition of the present embodiment contains a solder alloy. The solder alloy may be a lead-free alloy.

The solder alloy is not particularly limited, and any one of a lead-free (unleaded) solder alloy and a leaded solder alloy may be used, but a lead-free solder alloy is preferable from the viewpoint of influence on environment.

Specific examples of the lead-free solder alloys include alloys containing tin, silver, copper, zinc, bismuth, antimony, and the like, and more specific examples include alloys of Sn/Ag, Sn/Ag/Cu, Sn/Cu, Sn/Ag/Bi, Sn/Bi, Sn/Ag/Cu/Bi, Sn/Sb, Sn/Zn/Bi, Sn/Zn, Sn/Zn/Al, Sn/Ag/Bi/In, Sn/Ag/Cu/Bi/In/Sb, In/Ag, and the like. In particular, Sn/Ag/Cu is preferable.

The content of the solder alloy in the solder composition is not particularly limited, but it is, for example, 80% by mass or more and 95% by mass or less, and preferably 85% by mass or more and 90% by mass or less, and the like.

In the solder composition of the present embodiment, when the solder composition is produced as a solder paste, for example, it is preferred that the solder alloy is mixed at 80% by mass or more and 95% by mass or less and the flux is mixed at 5% by mass or more and 20% by mass or less.

Next, a method for producing the solder composition of the present embodiment is described.

As to the solder composition of the present embodiment, for example, a solder composition (solder paste) may be produced by, first, mixing a powdery solder alloy and a flux into a paste form, and then adding and mixing silicone oil thereto.

Alternatively, a solder composition may be produced by mixing a flux and silicone oil to prepare a flux-silicone oil mixture, and mixing a powdery solder alloy thereto.

Examples of a method of mixing the solder composition include mixing using a known mixing and stirring device or the like.

The solder composition of the present embodiment as described above can sufficiently suppress scattering of flux, solder balls and the like even when heated in reflow or the like.

For example, in vacuum reflow, scattering easily occurs since gas generation occurs in a short period of time. However, the solder composition of the present embodiment can suppress scattering even under heating under conditions that are likely to cause scattering like this vacuum reflow.

In addition, the solder composition of the present embodiment can sufficiently suppress scattering and at the same time sufficiently suppress generation of voids.

Particularly, in the case of a lead-free solder composition containing no lead as a solder alloy, there is a problem that gas is liable to remain due to volatile components of the flux and the like at the time of melting the solder, and as a result, voids are likely to occur. However, the solder composition of the present embodiment can suppress the generation of voids even when used in such a lead-free solder composition.

Even when the solder composition of the present embodiment is formed as a solder paste, printability is good, so that coating defects are unlikely to occur.

Although the solder composition according to the present embodiment is as described above, it is to be understood that the embodiments disclosed herein are given for exemplification and not for limitation in all aspects. The scope of the present invention is shown not by the above description, but by the scope of the claims, and it is intended to include meanings equivalent to the scope of the claims and all modifications within the scope.

EXAMPLES

Hereinafter, examples of the present invention are described together with comparative examples. It should be construed that the present invention is not limited to the following examples.

(Preparation of Solder Composition)

Solder compositions (Examples 1 to 7, and Comparative Examples 1 to 4) were prepared with the following materials and formulations.

Figure 4:
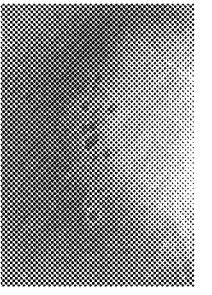
FIG. 4 is a table showing the formulations in which the materials shown are mixed for the method of preparing Comparative Examples 1-4.

For the preparation method, the materials are mixed in the formulations shown in FIGS. 3 and 4.

As a mixing order, first, a flux, a solder alloy and each silicone oil or each polymer were added and mixed in a stirrer (planetary mixer) for 15 minutes to obtain a paste-like solder composition.

Materials

Flux 1: M500-4 (rosin type, manufactured by KOKI Company Ltd.)

Flux 2: M650-3 (rosin type, manufactured by KOKI Company Ltd.)

Silicone oil 1: dimethyl polysiloxane (dimethyl silicone oil, CAS 6.148-62-9), trade name "KF-96H", manufactured by Shin-Etsu Chemical Co., Ltd., kinematic viscosity 50,000 $mm^2/s$ Silicone oil 2: dimethyl polysiloxane (CAS 6.148-62-9), trade name "KF-96H", manufactured by Shin-Etsu Chemical Co., Ltd., kinematic viscosity 100,000 $mm2/s$ Silicone oil 3: dimethyl polysiloxane (CAS 6.148-62-9), trade name "KF-96H", manufactured by Shin-Etsu Chemical Co., Ltd., kinematic viscosity 10,000 $mm^2/s$ Solder alloy powder: (Sn-3.0% Ag-0.5% Cu, particle size 20 to 38 µm)

Vinyl ether polymer non-aqueous defoaming agent

Olefin polymer non-aqueous defoaming agent

Scattering Test

Using the solder compositions of the above examples and comparative examples, test substrates were prepared as follows.

Two copper plates with a size of 30 mm×30 mm and a thickness of 0.3 mm were prepared so as to be one pair. The solder composition was applied on the surface of one of the copper plates by printing with a metal mask of 6.5 mm φ and 0.2 mm thick. Another copper plate was placed at a distance of 2 mm above the copper plate coated with the solder composition (see FIG. 1) and heated under the following temperature conditions.

Six test substrates were prepared for each solder composition.

Temperature conditions

Heating rate: 1.5° C./sec

Peak temperature: 220° C. or more, 40 seconds

Nitrogen atmosphere

Residual oxygen concentration 1000 ppm or less

After heating, the number of scattering flux adhering to the surface of the copper plate placed on the upper part was visually counted. The results are shown in FIGS. 3 and 4.

Photographs of the scattering state of each test substrate (photographing apparatus microscope, manufactured by KEYENCE CORPORATION, 50 times) are show in FIGS. 3 and 4.

Void Evaluation

Figure 2:
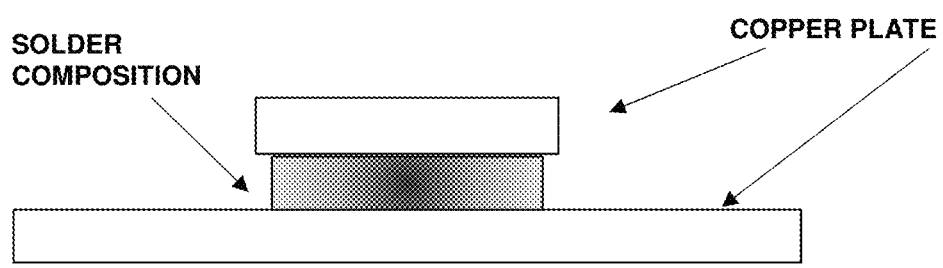
FIG. 2 is a schematic diagram showing a test method of an example.

A copper plate having a size of 30 mm×30 mm and a thickness of 0.3 mm was prepared, and the solder composition was applied on the surface of the copper plate by printing with a metal mask of 6.5 mm φ and 0.2 mm thick. A copper plate of 6 mm×6 mm was placed on the solder composition (see FIG. 2) and heated under the same temperature conditions as in the scattering test.

The area of the void generated in the solder after heating was calculated with image processing software (Paint shop pro, manufactured by Corel Corporation), and the void fraction was calculated from the void area and the solder area by the following method. Incidentally, each solder composition was applied to three copper plates to calculate the average void fraction.

Void fraction (%)=Total of void areas/Solder area× 100

The results are shown in FIGS. 3 and 4.

As shown in FIGS. 3 and 4, the number of scattering after heating the solder compositions of examples was 0 to 5, which was extremely few as compared with comparative examples. This was also clear from the photographs.

Further, the void fraction of the solder composition of examples was lower than that of Comparative Examples 1 and 2, that is, the voids were few.

What is claimed is:

1. A solder composition consisting of a flux, a solder alloy, and a silicone oil, wherein:
   the silicone oil has a kinematic viscosity at 25° C. of 10,000 $mm^2/s$ or more and 200,000 $mm^2/s$ or less;
   the solder alloy is an alloy of Sn/Ag, Sn/Ag/Cu, Sn/Cu, Sn/Ag/Bi, Sn/Bi, Sn/Ag/Cu/Bi, Sn/Sb, Sn/Ag/Bi/In, Sn/Ag/Cu/Bi/In/Sb, or In/Ag;
   the flux consists of a rosin component, a solvent component, and optionally an activator component, optionally an antioxidant component, and optionally a thixotropic component; and
   the rosin component consists of a polymerized rosin, a hydrogenated rosin, a natural rosin, a disproportionated rosin, an acid-modified rosin, or a combination thereof.

2. The solder composition according to claim 1, wherein the silicone oil has a kinematic viscosity at 25° C. of 100,000 $mm^2/s$ or less.

3. The solder composition according to claim 1, wherein the silicone oil is at least one member selected from the group consisting of dimethyl silicone oil, methylphenyl silicone oil, methylhydrogen silicone oil, reactive silicone oil, and non-reactive silicone oil.

4. The solder composition according to claim 1, wherein the silicone oil is contained in an amount of 0.05% by mass or more and 2% by mass or less.

5. The solder composition according to claim 1, wherein the solder alloy is a lead-free alloy.

6. The solder composition according to claim 1, wherein the solder alloy is an alloy of Sn/Ag.

7. The solder composition according to claim 1, wherein the solder alloy is an alloy of Sn/Ag, Sn/Ag/Cu, Sn/Ag/Bi, Sn/Ag/Cu/Bi, Sn/Ag/Bi/In, or Sn/Ag/Cu/Bi/In/Sb.

8. The solder composition according to claim 1, wherein the silicone oil has a weight average molecular weight of from about 10,000 to 120,000.

9. The solder composition according to claim 1, wherein the silicone oil has a weight average molecular weight of from about 50,000 to 95,000.

10. The solder composition according to claim 1, wherein the content of the silicone oil is 0.05% by mass or more and 2% by mass or less.

11. The solder composition according to claim 1, wherein the content of the silicone oil is 0.1% by mass or more and 1.0% by mass or less.

\* \* \* \* \*